United States Patent [19]
Johnson

[11] Patent Number: 4,548,229
[45] Date of Patent: Oct. 22, 1985

[54] OPEN-CLOSED CENTER HYDRAULIC VALVE ASSEMBLY

[75] Inventor: C. Donald Johnson, Fairmont, Minn.

[73] Assignee: Harsco Corporation, Camp Hill, Pa.

[21] Appl. No.: 252,053

[22] Filed: Apr. 8, 1981

[51] Int. Cl.[4] ............................................. F16K 11/07
[52] U.S. Cl. ................................. 137/270; 137/625.69
[58] Field of Search .................. 137/270, 270.5, 637.4, 137/625.69

[56] References Cited

U.S. PATENT DOCUMENTS

| | | |
|---|---|---|
| 2,903,011 | 9/1959 | Long . |
| 3,123,091 | 3/1964 | Elsey . |
| 3,314,443 | 4/1967 | Flick et al. . |
| 3,326,240 | 6/1967 | McConnaughay ............... 137/637.4 |
| 3,653,396 | 4/1972 | Logan . |
| 3,825,028 | 7/1974 | Herrmann . |
| 3,882,883 | 5/1975 | Droegemueller ................... 137/270 |
| 4,182,375 | 1/1980 | Fukano ............................ 137/625.69 |

FOREIGN PATENT DOCUMENTS 635023  3/1950  United Kingdom ............. 137/637.4

Primary Examiner—Alan Cohan
Attorney, Agent, or Firm—Kerkam, Stowell, Kondracki & Clarke

[57] ABSTRACT

A valve assembly for a pressurized fluid tool is disclosed. The valve assembly includes a spool inside a sleeve. Rotation of the sleeve by 180° causes the valve to change from an open center (normally open—N.O.) to a closed center (normally closed—N.C.) condition.

13 Claims, 11 Drawing Figures

N.C. OFF

N.C. ON

N.O. OFF

N.O. ON

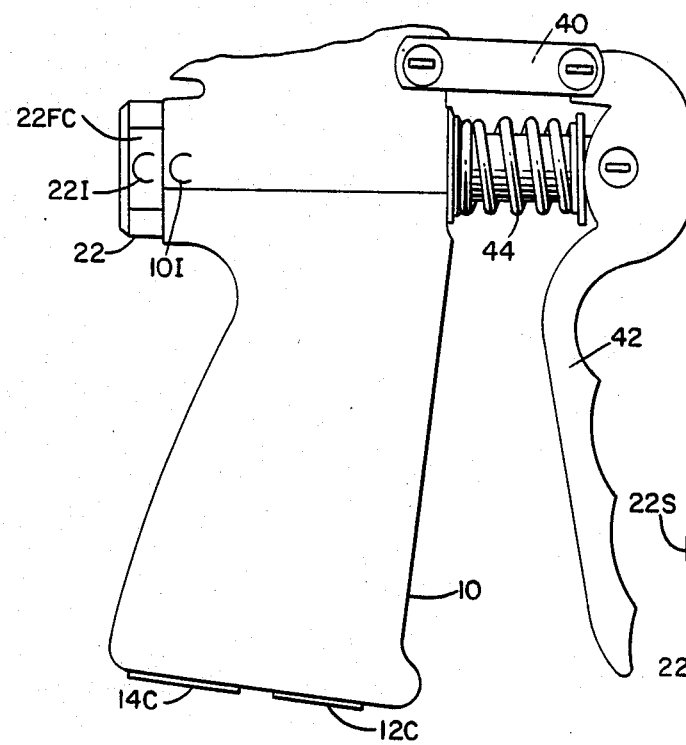
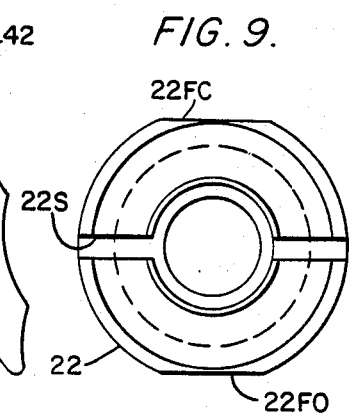
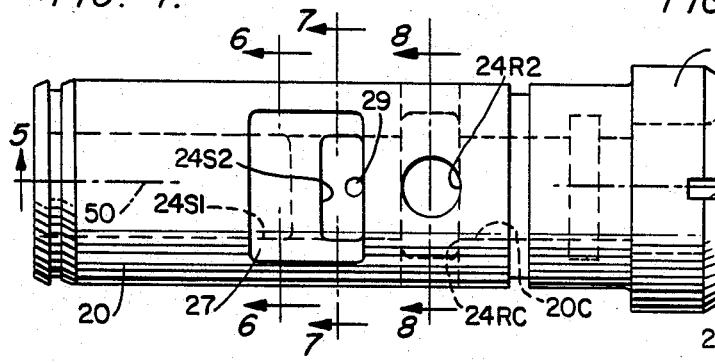
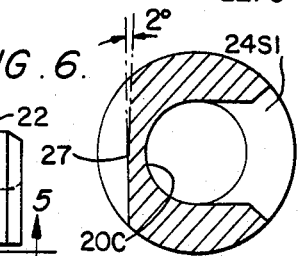
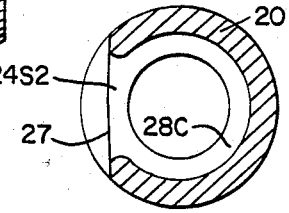
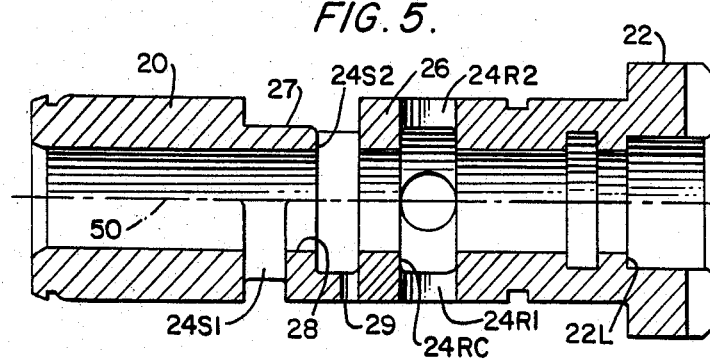
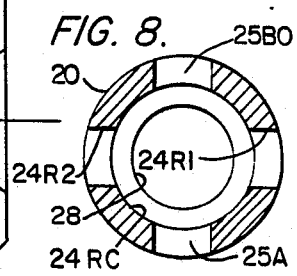

OPEN-CLOSED CENTER HYDRAULIC VALVE ASSEMBLY

BACKGROUND OF THE INVENTION

1. Field of the Invention

This invention relates to a valve for the control of fluid flow such as off-on hydraulic valves in a hydraulically driven hand tool. More specifically, it relates to a valve which may be used in both constant pressure and constant volume fluid systems without requiring the disassembly or replacement of any of the parts in the valve or the hydraulically driven tool.

2. Description of the Prior Art

Hydraulically operated hand tools are used with two basic types of hydraulic systems as the power source, i.e., the constant volume system and the constant pressure system. In the constant volume system, the on-off hydraulic valve must employ an open center spool so that in the off or neutral position the hydraulic oil or other fluid is free to flow uninterruptedly through the valve and back to the power source. In contrast, in the constant pressure system, the on-off hydraulic valve must employ a closed center spool so that in the off or neutral position the flow of oil is blocked so that system pressure can be substantially maintained.

Many users of such tools have both constant pressure and constant volume hydraulic power sources; and it would be highly desirable to be able to use the hand tools interchangeably with either system. At present, it is quite common to have duplicate tools in order to be able to accommodate either system. This requires a double inventory by the manufacturer, the distributor and the user. It increases capital costs, storage costs, ties up needed space on trucks and the like and can lead to costly time wastage if only one tool is brought to the job site and it turns out to be the wrong tool for the power system.

One possible remedy is to design the tool to accommodate interchangeable valve spools, one with an open center for a constant volume system and one with a closed center for a constant pressure system. The operator could then select and install the particular spool to match the power source. In practice, however, the proper spool may not always be readily available to match the power source. If available, it would require considerable time to dissassemble the valve, remove one spool, substitute the other spool and reassemble the valve.

Not only would this practice be very time-consuming and thus costly, it would require the proper tools, and someone with the skill to do it properly. The spool which is removed would be left unprotected and subject to loss. It would also present the possibility of damaging or losing components of the valve, e.g., springs, seals, and the like. It also unnecessarily would disturb the hydraulic seals and provide an opportunity for grit, dirt and other deleterious substances to be introduced into the hydraulic system.

The prior art has included several valve assemblies designed to overcome the above problems by working in either a normally closed or a normally open position. For example, U.S. Pat. No. 3,882,883 issued on May 13, 1975 to Droegemueller, discloses a valve assembly including a spool which may be rotated 180° in order to change the valve from functioning in a normally open mode to functioning in a normally closed mode. Although this invention has been very useful in overcoming many of the problems associated with other prior art designs, this valve assembly is still disadvantageous in that a linkage rod must be removed before the spool may be rotated. As with the duplicate spool systems discussed above, there is still the possibility of a part (linkage rod) of the apparatus being lost. Similarly subject to this problem are prior art valve assemblies wherein the spool is removed and replaced in a different orientation such that it changes from a normally closed configuration to a normally open configuration or vice versa. Yet another prior art arrangement is to use a spool having a first configuration in which it is spring biased to be normally open and a second configuration in which it is spring biased to be normally closed. Once again, the changing of the configuration usually requires the disassembly of at least some parts, thus raising the possibility of losing one or more parts. Moreover, all of the discussed prior art techniques requiring disassembly to change from a normally open condition to a normally closed condition are not especially convenient. Additionally, they often require relatively complex structures.

It is therefore an object of this invention to provide an improved hydraulic valve which may be converted from a normally open valve to a normally closed valve, and vice versa, without disassembly or removal of any parts.

Another object of the present invention is to provide an improved hydraulic valve which is relatively simple in construction and may be easily converted from a normally open condition to a normally closed condition and vice versa.

Yet another object of the present invention is to provide an improved on-off valve for controlling the flow of pressurized fluids.

A more specific object of the present invention is to provide a hydraulic valve assembly which may be quickly converted from an open center to a closed center configuration without special tools or skills or running the risk of damaging or losing the components or contaminating the valve assembly or creating leakage problems.

SUMMARY OF THE INVENTION

These and other objects of the present invention which will become apparent as the description proceeds are accomplished by an apparatus having a body housing, a motor powered by pressurized fluid, a valve attached to the body housing and controlling the flow of pressurized fluid to the motor, and a motor actuator operably connected to the valve and adapted to change the valve between an on state wherein pressurized fluid flows to power the motor and an off state wherein pressurized fluid does not flow to power the motor. The valve includes a generally cylindrical spool having an axis and disposed at least partly in the cavity within a sleeve. The motor actuator is operative to shift the valve between the on state and the off state by causing state-changing movement of at least a part of the valve. The valve is further adapted for a condition-changing movement of at least a part of the valve to change the valve between a normally closed condition having an off state with substantially no flow of pressurized fluid through the valve and a normally open condition having an off state with a continuous flow of pressurized fluid in the sleeve. The valve is further adapted to allow the condition-changing movement with the spool remaining at least partly within the sleeve, the condition changing movement being a rotation of at least a part of the valve. The sleeve is secured to the body housing and free to rotate with respect thereto, and the condition changing movement is a rotation of the sleeve. Furthermore, the sleeve is coaxial to the spool and the state-changing movement includes an axially displacement of the spool relative to the sleeve. The spool includes a fluid blocking center land in between a first recessed portion and a second recessed portion.

BRIEF DESCRIPTION OF THE DRAWINGS

The present invention will be more clearly understood from the following detailed description of a specific embodiment, read in conjunction with the accompanying drawings wherein:

FIG. 3 shows a fragmentary view of the present valve assembly in a particular hydraulic hand tool.

FIG. 4 is a top view of the sleeve of the present valve assembly when disposed in a normally closed condition.

FIG. 5 is a cross sectional view along lines 5—5 of the sleeve of FIG. 4.

FIG. 6 is a sectional view along lines 6—6 of the sleeve of FIG. 4.

FIG. 7 is a cross sectional view along lines 7—7 of the sleeve of FIG. 4.

FIG. 8 is a cross sectional view along lines 8—8 of the sleeve of FIG. 4.

FIG. 9 is an end view of ring adjustor 22.

DETAILED DESCRIPTION OF THE INVENTION

Figure 1A:
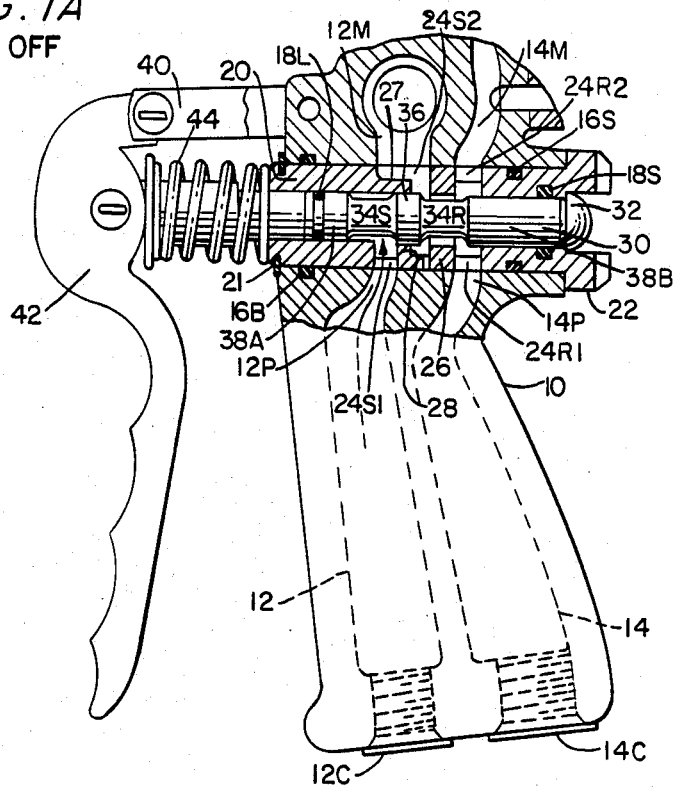
FIG. 1A shows a fragmentary cross sectional view of the valve assembly of the present invention disposed in a normally closed condition and an off state.
Figure 1B:
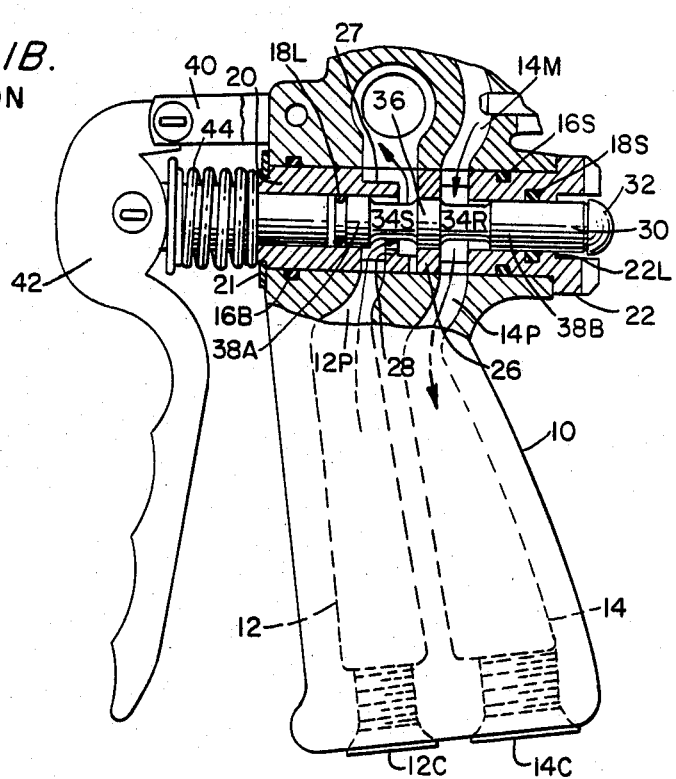
FIG. 1B shows a fragmentary cross sectional view of the valve assembly of the present invention in a normally closed condition and an on state.

Turning now to FIGS. 1A and 1B, there is shown in fragmentary cross sectional view a body housing 10 which would include a hydraulic impact wrench on that part which has been broken away. Disposed within body housing 10 are a supply conduit 12 and an exhaust conduit 14. Both supply conduit 12 and exhaust conduit 14 include connecting portions 12C and 14C respectively for connecting lines for supplying and removing pressurized fluid such as hydraulic oil. At the top of each of conduits 12 and 14 are ports labeled respectively 12P and 14P for which respectively communicate with a motor supply conduit 12M and a motor return conduit 14M in a manner which will be described shortly. Inasmuch as motor supply conduit 12M and motor return conduit 14M communicate with a conventional hydraulic motor in a conventional manner, the details of this operation will be readily apparent to those of ordinary skill in the art, and need not be discussed in detail. Controlling the communication between supply port 12P and motor supply conduit 12M and the communication between motor return conduit 14M and exhaust port 14P is a valve comprising sleeve 20 and spool 30 disposed within the sleeve 20. The sleeve 20 is secured within body housing 10 by a locking ring 21 at one end and an adjuster ring 22 at the other end. In addition to securing sleeve 20 within body housing 10, adjuster ring 22 provides for the rotation of sleeve 20 as will be discussed below. Sealing the interface between body housing 10 and sleeve 20 are O-rings 16B and 16S respectively seated within the body housing and the sleeve. O-rings 18L and 18S, respectively seated on spool 30 and sleeve 22, are used to seal the interface between the spool and the sleeve.

Trigger 42, connected to body housing 10 by arm 40, serves to change the valve between an off state and an on state, thereby turning the hydraulic motor off and on accordingly. Spring 44 biases the spool 30 such that spool cap 32 abuts an inner flange 22L (labeled on FIG. 1B only) on sleeve 20. Spool 30 includes a first or supply recess portion 34S and a second or return recess portion 34R with a land 36 disposed in between the recess portions. Land 36 functions as a fluid blocking center land for selectively turning the motor on and off, whereas the spool 30 also includes end lands 38A and 38B for sealing the hydraulic oil or other pressurized fluid. As shown, the spool 30 is generally cylindrical, meaning that any cross section taken in a plane perpendicular to its axis will define a circle. If desired, spool 30 may be partially hollow with end cap 32 sealing one end. A hole (not shown) may be drilled in spool 30 just before O-ring 18L such that any hydraulic fluid which has passed land 38A will tend to go into the hollow cavity (not shown) in the spool and may proceed out a similar hole which could be drilled in the second recess portion 34R.

Sleeve 30 includes four ports for conveying the pressurized fluid. A first supply port 24S1 communicates with supply port 12P of conduit 12, whereas a second supply port 24S2 communicates with motor supply conduit 12M. Motor return conduit 14M communicates with a return port 24R2 in sleeve 20, whereas return port 24R1 in sleeve 20 communicates with exhaust port 14P of exhaust conduit 14. In between the supply ports and the return ports of sleeve 20 is a fluid blocking ring 26. Sleeve 20 includes a recess portion 27. An inwardly projecting ridge 28 cooperates with center land 36 of spool 30 to block the flow of pressurized fluids. A small hole 29 is drilled in the sleeve 20 in between ridge 28 and ring 26.

Turning now to the operation of the present invention, in FIG. 1A the valve assembly including sleeve 20 and spool 30 is disposed in a normally closed (N.C.) condition and an off state. Any pressurized fluid fed into the valve assembly by supply conduit 12 will be prevented from flowing to motor input conduit 12M by land 36 and the adjacent parts of sleeve 20 including blocking ridge 28, the arrow diagramatically representing this. Upon the depression of trigger 42, the spool 30 will be axially displaced to the right as shown in FIG. 1B, compressing the spring 42. This movement along the common axis of spool 30 and sleeve 20 changes the state of the valve assembly from off to on. As shown in FIG. 1B the displacement of land 36 to be lined up inside of the ring 26 of sleeve 20 allows pressurized fluid to readily flow from first supply port 24S1 of sleeve 20 to second supply port 24S2 of sleeve 20 by way of first or supply recess portion 34S of spool 30. Additionally, as shown by the arrow lines, the motor return conduit 14M freely communicates with exhaust port 14P by way of sleeve return ports 24R2 and 24R1 and the second or return recess portion 34R of spool 30. Accordingly, the hydraulic motor for the impact wrench or other tool will now be powered.

Figure 2A:
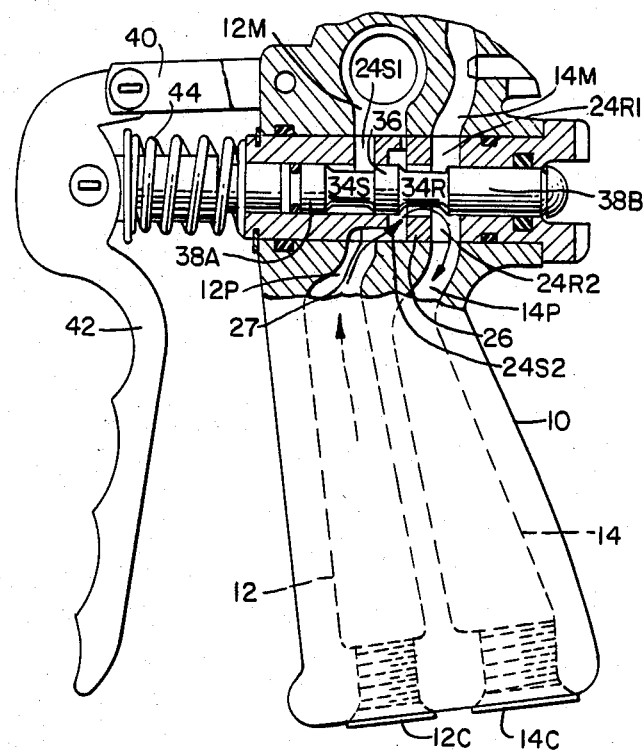
FIG. 2A shows a fragmentary cross sectional view of the valve assembly of the present invention disposed in a normally open condition and an off state.
Figure 2B:
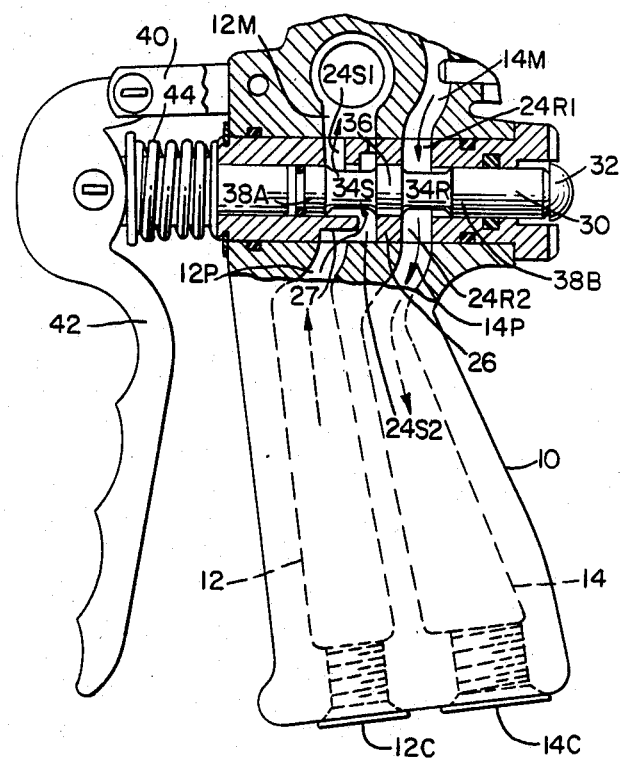
FIG. 2B shows a fragmentary cross sectional view of the valve assembly of the present invention in a normally open condition and an on state.

Turning now to FIGS. 2A and 2B, the valve assembly of the present invention is shown in a normally open (N.O.) condition. The sleeve 20 was converted from the normally closed condition of FIGS. 1A and 1B to the normally open condition of FIGS. 2A and 2B by rotating sleeve 20 180° by the use of ring adjuster 22. As shown in FIG. 2A, supply port 12P of conduit 12 now communicates with supply path port 24S2 of sleeve 20, whereas supply path port 24S1 of sleeve 20 now communicates with motor supply port 12M. Similarly, the positions of return path ports 24R1 and 24R2 have been interchanged. As indicated by the fluid flow arrows, the recess portion 27 of sleeve 20 and second recess portion 34R of spool 30 allows pressurized fluid to readily flow from supply conduit 12 into exhaust conduit 14. In the normally open (N.O.) condition and off state shown in FIG. 2A, the center land 36 will prevent fluid flow between sleeve supply path port 24S2 and sleeve supply path port 24S1. When the trigger 42 is depressed, the spool 30 is moved axially to the right as shown in FIG. 2B. Center land 36 will line up inside of ring 26 causing the pressurized fluid to flow from supply conduit 12 to motor input conduit 12M in a manner similar to that shown in FIG. 1B except that the position of sleeve supply path ports 24S1 and 24S2 are switched from that shown in FIG. 1B. Likewise, the return path of pressurized fluid from motor return conduit 14M to exhaust conduit 14 is substantially the same as that shown and discussed for FIG. 1B except that sleeve return path ports 24R1 and 24R2 have reversed their positions. Although not necessary to the present invention, hole 29 has been included in between ridge 28 and ring 26 such that the hydraulic motor will not stop instantaneously when changed from the on state shown in FIG. 2B to the off state shown in FIG. 2A.

As shown in FIGS. 1A, 1B, 2A and 2B, the motor actuating trigger 42 is disposed on one side of the housing 10, whereas the adjustor ring 22 is disposed on an opposite side of the housing 10.

Turning now to FIG. 3, a fragmentary view is shown of body housing 10 from the opposite side from that shown in the FIGS. 1A, 1B, 2A, and 2B. Body housing 10 includes an indicium 10I which may be used with an indicium 22I on aduster ring 22 for indicating whether the valve is in the closed center (C.C. or N.C.) condition or the open center (O.C. or N.O.) condition. In the position shown in FIG. 3, the valve assembly is in the "CC" or closed center condition. The ring aduster 22 may include an O on the side opposite the C so as to indicate an open center (OC) condition when ring aduster 22 is rotated 180°.

Turning now to FIG. 4, a top view of sleeve 20 disposed in the normally closed condition (recess portion 27 on top) is shown. The details of the construction of sleeve 20 will now be discussed with reference to FIG. 4 and the associated cross sectional views of FIGS. 5, 6, 7, and 8.

Sleeve 20 is generally cylindrical as shown defining a center line 50 and having a generally cylindrical center cavity 20C also centered about line 50. The spool 30 (not shown in FIGS. 4-8) will be disposed within the cavity 20C when the valve is assembled. On one side of generally flat recess portion 27 in sleeve 20 is a rectangular hole defining supply path port 24S2 which communicates with cavity 20C of the sleeve 20. Communicating with cavity 20C from the side opposite supply path port 24S2 is the supply path port 24S1. As shown supply path ports 24S1 and 24S2 are axially removed from each other, ridge 28 being disposed axially in between them. Return path ports 24R1 and 24R2 communicate with cavity 20C from opposite sides. Although not necessary for the operation of the present invention, the manufacturing of the spool 20 may be expedited by the use of holes 25A and 25B, each 90° separated from the return path ports 24R1 and 24R2. Ring 26 is disposed between the two supply path ports 24S1 and 24S2 and the return path ports 24R1 and 24R2. Note also that all of these four holes 25A, 25B, 24R1 and 24R2 are disposed in a return cavity 24RC having a larger diameter than the general sleeve cavity 20C. Note that inwardly projecting ridge 28 defines a surface 28C which also corresponds to the end of recess portion 27 and beginning of supply path port 24S2. That portion of cavity 20C to the left of center ring 26 (as seen in FIG. 5) defines a supply path cavity between supply path port 24S1 and supply path port 24S2. That portion of cavity 20C to the right of center ring 26 includes a return path cavity 24RC as shown.

FIG. 9 shows an end view of the ring adjustor 22 which has a flat surface 22FC (closed "C" indicium thereupon) and an opposite flat surface 22FO (open "O" indicium thereupon). A slot 22S in the adjustor ring 22 allows the ring to be turned 180° by accomodating a screwdriver or even a coin.

Although the present invention has been described in detail in connection with specific embodiments, it will be understood that these are for illustrative purposes only. Numerous modifications and adaptations will readily suggest themselves to one of ordinary skill in the art. Accordingly, the scope of the present invention should be determined by reference to the appended claims.

What is claimed is:

1. An apparatus having a body housing, a motor powered by pressurized fluid, a valve for controlling the flow of pressurized fluid to said motor, said valve attached to said body housing, a motor actuator operably connected to said valve and adapted to change the valve between an ON state wherein pressurized fluid flows to power said motor and an OFF state wherein pressurized fluid does not flow to power said motor; and wherein said valve includes a spool having an axis and disposed at least partly in a cavity within a sleeve, said motor actuator is operative to shift said valve between the ON state and the OFF state by causing state-changing movement of at least a part of said valve; and said valve is further adapted for a condition-changing movement of at least a part of said valve to change said valve between a normally closed condition having an OFF state with substantially no flow of pressurized fluid through said valve and a normally open condition having an OFF state with a continuous flow of pressurized fluid in said sleeve, and said condition-changing movement is a rotation of at least a part of said valve, and wherein said valve is further adapted to allow said condition-changing movement with said spool remaining at least partly within said sleeve, and wherein said motor actuator is disposed at least partly externally on one side of said housing and a rotatable adjustor is disposed on a side of said housing opposite said one side, and said adjustor is operative to change the valve between a normally closed condition and a normally open condition.

2. An apparatus having a body housing, a motor powered by pressurized fluid, a valve for controlling the flow of pressurized fluid to said motor, said valve attached to said body housing, a motor actuator operably connected to said valve and adapted to change the valve between an ON state wherein pressurized fluid flows to power said motor and an OFF state wherein pressurized fluid does not flow to power said motor; and wherein said valve includes a spool having an axis and disposed at least partly in a cavity within a sleeve, said motor actuator is operative to shift said valve between the ON state and the OFF state by causing state-changing movement of at least a part of said valve; and said valve is further adapted for a condition-changing movement of at least a part of said valve to change said valve between a normally closed condition having an OFF state with substantially no flow of pressurized fluid through said valve and a normally open condition having an OFF state with a continuous flow of pressurized fluid in said sleeve, and said condition-changing movement is rotation of at least a part of said valve, and wherein said sleeve is secured to said body housing and free to rotate with respect to said body housing, and said condition-changing movement includes a rotation of said sleeve relative to said body housing and wherein said valve is adapted such that when it is in an ON state pressurized fluid may flow in a supply path:

from a supply conduit into said sleeve and by a first recessed portion on said spool, out of said sleeve, and to said motor;

and in a return path:

from said motor into said sleeve and by a second recessed portion on said spool, out of said sleeve and into an exhaust conduit, and wherein said sleeve includes a first supply path port and a second supply path port; and when the valve is in an ON state and normally closed condition pressurized fluid may freely flow from said supply conduit into said sleeve by said first supply path port and out of said sleeve by said second supply path port; and when the valve is in an ON state and normally open condition pressurized fluid may freely flow from said supply conduit into said sleeve by said second supply path port and out of said sleeve by said first supply path port.

3. The apparatus of claim 2 wherein said sleeve is coaxial to said spool and said state-changing movement includes an axial displacement of said spool relative to said sleeve, and said spool is generally cylindrical.

4. The apparatus of claim 3 wherein said spool includes a fluid-blocking center land in between said first recessed portion and said second recessed portion.

5. The apparatus of claim 4 wherein said valve is adapted such that, when it is in an OFF state, and normally closed condition, said center land blocks pressurized fluid from flowing from said supply conduit to said motor; and, when said valve is in an OFF state and normally open condition, said sleeve allows pressurized fluid from said supply conduit to bypass said center land and flow continously from said supply conduit to said exhaust conduit without powering said motor.

6. The apparatus of claim 5 wherein said sleeve includes a center ring and said axial displacement of said spool relative to said sleeve renders said valve in an ON state when said center land of said spool is lined up inside of said center ring of said sleeve.

7. The apparatus of claim 6 wherein said first supply path port and second supply path port are axially displaced from each other and both on the same side of said center ring; and when said valve is in an OFF state and normally closed condition said center land blocks the flow of pressurized fluid from said first supply path port to said second supply path port; and when said valve is in an OFF state and normally open condition said center land blocks the flow of pressurized fluid from said second supply path port to said first supply path port.

8. The apparatus of claim 1 or 2 further including a spring biasing said valve in an OFF state by holding said spool in a particular axial position relative to said sleeve; and said motor actuator includes a depressable trigger adapted to change said valve into an ON state by axially moving said spool relative to said sleeve upon depression of said trigger.

9. The apparatus of claim 2 or 7 wherein said condition-changing movement is a 180° rotation of said sleeve.

10. The apparatus of claim 3 or 7 wherein said sleeve is disposed at least partly within said body housing and includes a rotatable adjustor ring adapted to change the valve between a normally closed condition and a normally open condition.

11. The apparatus of claim 1 or 3 wherein said valve is adapted such that when it is in an ON state pressurized fluid may flow in a supply path:

from a supply conduit into said sleeve and around a supply portion of said spool, out of said sleeve, and to said motor;

and in a return path:

from said motor to said sleeve and by a return portion of said spool, out of said sleeve and into an exhaust conduit.

12. The apparatus of claim 1 wherein said sleeve includes a first supply path port and a second supply path port; and when the valve is in an ON state and normally closed condition pressurized fluid may freely flow from a supply conduit into said sleeve by said first supply path port and out of said sleeve by said second supply path port; and when the valve is in an ON state and normally open condition pressurized fluid may freely flow from said supply conduit into said sleeve by said second supply path port and out of said sleeve by said first supply path port.

13. The apparatus of claim 1, 2 or 3 wherein the valve is adapted to allow the condition-changing movement with the apparatus in assembled form without any parts of the apparatus being removed.

* * * * *